(12) United States Patent
Lei et al.

(10) Patent No.: US 12,143,972 B2
(45) Date of Patent: Nov. 12, 2024

(54) APPARATUS AND METHOD OF SCHEDULING MULTI-TTI TRANSMISSIONS

(71) Applicant: LENOVO (BEIJING) LIMITED, Beijing (CN)

(72) Inventors: Haipeng Lei, Beijing (CN); Alexander Golitschek Edler Von Elbwart, Darmstadt (DE); Yu Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 501 days.

(21) Appl. No.: 17/442,050

(22) PCT Filed: Mar. 29, 2019

(86) PCT No.: PCT/CN2019/080454
§ 371 (c)(1),
(2) Date: Sep. 22, 2021

(87) PCT Pub. No.: WO2020/198947
PCT Pub. Date: Oct. 8, 2020

(65) Prior Publication Data
US 2022/0174667 A1 Jun. 2, 2022

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2019/0200355 A1* | 6/2019 | Baldemair | ........ | H04W 72/0446 |
| 2019/0215807 A1* | 7/2019 | Hwang | ..................... | H04L 5/00 |

FOREIGN PATENT DOCUMENTS

| | | |
|---|---|---|
| CN | 106455091 A | 2/2017 |
| KR | 20190027705 A | 3/2019 |

(Continued)

OTHER PUBLICATIONS

International Searching Authority, "Written Opinion of the International Searching Authority," PCT/CN2019/080454, Dec. 13, 2019, pp. 1-4.

(Continued)

*Primary Examiner* — Minh Trang T Nguyen
(74) *Attorney, Agent, or Firm* — Kunzler Bean & Adamson

(57) ABSTRACT

An apparatus and method for scheduling Multi-TTI transmissions, for PDSCH and PUSCH. 1. The disclosure provides an apparatus having: a receiver that receives downlink control information (DCI) scheduling a plurality of data channels, wherein the DCI contains a first indicator indicating a first time domain resource allocation pattern selected from a set of predefined time domain resource allocation patterns for time domain resources of the plurality of data channels; a processor that performs a channel access procedure for each of the plurality of data channels; and a transmitter that transmits the plurality of data channels in the time domain resources in response to the channel access procedure for a corresponding data channel being successful.

20 Claims, 11 Drawing Sheets

802
Receiving DCI scheduling a plurality of data channels, wherein the DCI contains a first indicator indicating a first time domain resource allocation pattern selected from a set of predefined time domain resource allocation patterns for time domain resources of the plurality of data channels 804
Performing a channel access procedure for each of the plurality of data channels 806
Transmitting the plurality of data channels in the time domain resources in response to the channel access procedure for a corresponding data channel being successful

(56) References Cited

FOREIGN PATENT DOCUMENTS

| WO | 2017196129 | A1 | 11/2017 |
| WO | 2018174761 | A1 | 9/2018 |
| WO | 2019050379 | A1 | 3/2019 |

OTHER PUBLICATIONS

Apple Inc., Power Saving Techniques based on UE Adaptation, 3GPP TSG-RAN WG1 Meeting Ad-Hoc 1901, R1-1900753, Jan. 21-25, 2019, pp. 1-12, Taipei, Taiwan.

Apple Inc., UE Power Saving Techniques, 3GPP TSG-RAN WG1 Meeting #96, R1-1902771, Feb. 25-Mar. 1, 2019, pp. 1-15, Athens, Greece.

* cited by examiner

| PDSCH mapping type | Normal cyclic prefix | | | Extended cyclic prefix | | |
|---|---|---|---|---|---|---|
| | S | L | S+L | S | L | S+L |
| Type A | {0,1,2,3} (Note 1) | {3,...,14} | {3,...,14} | {0,1,2,3} (Note 1) | {3,...,12} | {3,...,12} |
| Type B | {0,...,12} | {2,4,7} | {2,...,14} | {0,...,10} | {2,4,6} | {2,...,12} |
| Note 1: S = 3 is applicable only if *dmrs-TypeA-Posiition* = 3 | | | | | | |

Figure 4A

| | Starting positions (start of symbol #) | Ending positions (end of symbol #) |
|---|---|---|
| PDSCH Type A | {0, 1, 2, 3} | {2,3,4,...,13} |
| PDSCH Type B | {0,1,...,12} | {1,2,...,13} |

Figure 4B

| PUSCH mapping type | Normal cyclic prefix | | | Extended cyclic prefix | | |
|---|---|---|---|---|---|---|
| | S | L | S+L | S | L | S+L |
| Type A | 0 | {4,...,14} | {4,...,14} | 0 | {4,...,12} | {4,...,12} |
| Type B | {0,...,13} | {1,...,14} | {1,...,14} | {0,...,12} | {1,...,12} | {1,...,12} |

Figure 4C

| | Starting positions (start of symbol #) | Ending positions (end of symbol #) |
|---|---|---|
| PUSCH Type A | {0} | {3,4,...,13} |
| PUSCH Type B | {0,1,...,13} | {0,1,...,13} |

Figure 4D

```
PUSCH-TimeDomainResourceAllocation::= SEQUENCE
{
    k2 INTEGER(0..32),
    mappingType ENUMERATED {typeA, typeB},
    startSymbolAndLength INTEGER (0..127)
}
```

Figure 6A

```
PUSCH-TimeDomainResourceAllocation::= SEQUENCE
{
    k2_1 INTEGER(0..32),
    mappingType_1 ENUMERATED {typeA, typeB},
    startSymbolAndLength_1 INTEGER (0..127), k2_2 INTEGER(0..32),
    mappingType_2 ENUMERATED {typeA, typeB},
    startSymbolAndLength_2 INTEGER (0..127),

...

k2_N INTEGER(0..32),
    mappingType_N ENUMERATED {typeA, typeB},
    startSymbolAndLength_N INTEGER (0..127)
}
```

Figure 6B

```
PUSCH-TimeDomainResourceAllocation::= SEQUENCE
{
    k2 INTEGER(0..32), mappingType_1 ENUMERATED {typeA, typeB},
    startSymbolAndLength_1 INTEGER (0..127), mappingType_2 ENUMERATED {typeA, typeB},
    startSymbolAndLength_2 INTEGER (0..127),

...

mappingType_N ENUMERATED {typeA, typeB},
    startSymbolAndLength_N INTEGER (0..127)
}
```

Figure 6C

```
PUSCH-TimeDomainResourceAllocation::= SEQUENCE
{
    k2 INTEGER(0..32),
    mappingType ENUMERATED {typeA, typeB}, startSymbolAndLength_1 INTEGER (0..127),
    startSymbolAndLength_2 INTEGER (0..127),
    ...
    startSymbolAndLength_N INTEGER (0..127)
      }
```

Figure 6D

```
PUSCH-TimeDomainResourceAllocation::= SEQUENCE
{
    k2 INTEGER(0..32),
    mappingType ENUMERATED {typeA, typeB}, startSymbolAndLength_1 INTEGER (0..127),
    numberOfScheduledPUSCHs INTEGER(0..Maximum number of scheduled PUSCHs)
      }
```

Figure 6E

```
PUSCH-TimeDomainResourceAllocation::= SEQUENCE
{
    k2 INTEGER(0..32),
    mappingType ENUMERATED {typeA, typeB}, startSymbolAndLength INTEGER (0..127),
    numberOfScheduledPUSCHs INTEGER(0..Maximum number of scheduled PUSCHs)
      }
```

Figure 6F

```
PUSCH-TimeDomainResourceAllocation::= SEQUENCE
{
    k2 INTEGER(0..32),
    mappingType ENUMERATED {typeA, typeB}, startSymbol_1 INTEGER(0..13),
    startSymbol_2 INTEGER(0..13),
    ...
    startSymbol_N INTEGER(0..13),
    length INTEGER(1...14)
}
```

Figure 6G

```
PUSCH-TimeDomainResourceAllocation::= SEQUENCE
{
    k2 INTEGER(0..32),
    mappingType ENUMERATED {typeA, typeB}, startSymbol_1 INTEGER(0..13),
    startSymbol_2 INTEGER(0..13),
    ...
    startSymbol_N INTEGER(0..13), length_N INTEGER(1...14)
}
```

Figure 6H

```
PUSCH-TimeDomainResourceAllocation::= SEQUENCE
{
    k2_1 INTEGER(0..32),
    k2_2 INTEGER(0..32),
    ...
    k2_N INTEGER(0..32), mappingType ENUMERATED {typeA, typeB}, startSymbolAndLength INTEGER (0..127)
}
```

Figure 6I

| Code point value | Indicated time domain resource allocation pattern of the list |
|---|---|
| 0 | The first PUSCH-TimeDomainResourceAllocation |
| 1 | The second PUSCH-TimeDomainResourceAllocation |
| 2 | The third PUSCH-TimeDomainResourceAllocation |
| 3 | The fourth PUSCH-TimeDomainResourceAllocation |
| 4 | The fifth PUSCH-TimeDomainResourceAllocation |
| 5 | The sixth PUSCH-TimeDomainResourceAllocation |
| 6 | The seventh PUSCH-TimeDomainResourceAllocation |
| 7 | The eighth PUSCH-TimeDomainResourceAllocation |
| 8 | The ninth PUSCH-TimeDomainResourceAllocation |
| 9 | The tenth PUSCH-TimeDomainResourceAllocation |
| 10 | The eleventh PUSCH-TimeDomainResourceAllocation |
| 11 | The twelfth PUSCH-TimeDomainResourceAllocation |
| 12 | The thirteenth PUSCH-TimeDomainResourceAllocation |
| 13 | The fourteenth PUSCH-TimeDomainResourceAllocation |
| 14 | The fifteenth PUSCH-TimeDomainResourceAllocation |
| 15 | The sixteenth PUSCH-TimeDomainResourceAllocation |

Figure 7

APPARATUS AND METHOD OF SCHEDULING MULTI-TTI TRANSMISSIONS

FIELD

The subject matter disclosed herein relates generally to wireless communication, and more particularly relates to apparatus and methods of scheduling Multi-TTI (Multiple Transmission Time Interval) transmissions.

BACKGROUND

The following abbreviations and acronyms are herewith defined, at least some of which are referred to within the following description.

Third Generation Partnership Project ("3GPP"), 5G Node B (gNB), 5th Generation (5G), Bandwidth Part (BWP), Channel Occupancy Time (COT), Code Block Group (CBG), Code Block Group Transmission Information (CBGTI), Cyclic Prefix (CP), Demodulation Reference Signal (DMRS), Downlink (DL), Downlink Control Indicator (DCI), Downlink Shared Channel (DL-SCH), Enhanced Licensed Assisted Access (eLAA), Evolved Node B (eNB), High-Speed Downlink Packet Access (HSDPA), Hybrid Automatic Repeat Request (HARQ), Hybrid Automatic Repeat Request-Positive Acknowledgement (HARQ-ACK), Information Element (IE), Listen Before Talk (LBT), Long Term Evolution (LTE), LTE Advanced (LTE-A), Maximum Channel Occupancy Time (MCOT), Modulation Coding Scheme (MCS), Multiple Transmission Time Interval (Multi-TTI), Network Equipment (NE), New Data Indicator (NDI), New Radio (NR), NR access on unlicensed spectrum (NR-U), Orthogonal Frequency Division Multiplexing (OFDM), Physical Downlink Shared Channel (PDSCH), Physical Uplink Shared Channel (PUSCH), Radio Access Technology (RAT), Radio Frequency (RF), Radio Resource Control (RRC), Redudency Version (RV), Single-Carrier Frequency-Division Multiple Access (SC-FDMA), Start and Length Indicator (SLIV), Subcarrier Spacing (SCS), Third Generation Partnership Project (3GPP), Time Domain Resource Allocation (TDRA), Time-Division Duplexing (TDD), Transmission Time Interval (TTI), Transport Block (TB), Transport Block Size (TBS), Universal Mobile Telecommunications System (UMTS), Uplink (UL), Uplink Shared Channel (UL-SCH), User Entity/Equipment (UE), Worldwide Interoperability for Microwave Access (WiMAX).

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations, and a base station may perform wireless communication with UEs.

Transmission Time Interval (TTI) refers to the duration of a transmission on the radio link. In UMTS Release '99, the shortest TTI is 10 ms. In UMTS Release-5, the TTI for HSDPA is reduced to 2 ms. In LTE, the TTI equals to a subframe of 1 millisecond (ms), which consists of 14 OFDM symbols in the downlink and 14 SC-FDMA symbols in the uplink for the user data in the Physical Downlink Shared Channel (PDSCH) and the Physical Uplink Shared Channel (PUSCH) with normal length of the cyclic prefix (CP).

In NR network, the TTI may be further reduced and is designed flexibly. Regarding DL and UL scheduling, NR can support both slot-based transmission and mini-slot based transmission. Each subframe consists of a number of slots, determined based on subcarrier spacing. Each slot may have either 14 (normal CP) or 12 (extended CP) OFDM symbols. Slot is a typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference with other RF links. Mini-slot helps to achieve lower latency in 5G NR architecture.

Mini-slots are not tied to the frame structure. A mini-slot may occupy a predefined number of OFDM symbols, e.g. 2, 4 or 7 symbols for DL transmission. It enables sub-slot based scheduling. It is the minimum scheduling unit used in 5G NR and is variable in length. Mini-slots can be positioned asynchronously with respect to the beginning of a standard slot.

Multiple Transmit Time Interval (multi-TTI) uplink grants are supported in LTE TDD uplink/downlink configuration 0. A multi-TTI uplink grant schedules uplink transmissions in multiple uplink subframes. NR networks also support multiple transmission time interval (TTI) scheduling. As such, a single TB or multiple TBs could be scheduled by a single grant using multi-TTI scheduling.

For NR access on unlicensed spectrum (NR-U), in order to achieve fair coexistence with other wireless systems, channel access procedure, i.e., LBT (listen before talk) is required before the transmission on unlicensed spectrum. By means of performing energy detection on a certain channel, if the received power is below a predefined threshold, then the LBT is successful, which means the channel is deemed as empty and is available for transmission; if the received power is above the predefined threshold, then the LBT is failed, which means the channel is occupied by other nodes or other wireless systems and is not available for transmission. Only when the LBT is successful, a piece of equipment can start its transmission on the channel and occupy the channel up to a maximum channel occupancy time (MCOT); otherwise, the equipment cannot start the transmission and continues to perform LBT until a successful LBT.

It was agreed for the NR-U design not to require the UE to change a granted TBS for a PUSCH transmission depending on the LBT outcome. The following options have been identified as possible candidates at least for the first PUSCH(s) transmitted in the UL transmission burst.

Option 1: PUSCH(s) as in Rel-15 NR

Option 2: Multiple starting positions in one or multiple slot(s) are allowed for PUSCH(s) scheduled by a single UL grant (i.e., not a configured grant) and one of the multiple PUSCH starting positions can be decided depending on the LBT outcome. It is noted that for the above options, the ending position of the PUSCH is fixed as indicated by the UL grant. It is also noted that the above options are not mutually exclusive.

It was agreed to support single UL grant scheduling multiple contiguous PUSCHs for NR-U. Scheduling PUSCH over multiple slots/mini-slots by a single DCI supports at least multiple continuous PUSCHs with separate TBs. Each TB is mapped to at most one slot or one mini-slot.

SUMMARY

According to a first aspect, there is provided an apparatus comprising: a receiver that receives downlink control information (DCI) scheduling a plurality of data channels, wherein the DCI contains a first indicator indicating a first time domain resource allocation pattern selected from a set of predefined time domain resource allocation patterns for time domain resources of the plurality of data channels; a processor that performs a channel access procedure for each of the plurality of data channels; and a transmitter that transmits the plurality of data channels in the time domain resources in response to the channel access procedure for a corresponding data channel being successful.

According to a second aspect, there is provided an apparatus comprising: a transmitter that transmits downlink control information (DCI) scheduling a plurality of data channels, wherein the DCI contains a first indicator indicating a first time domain resource allocation pattern selected from a set of predefined time domain resource allocation patterns for time domain resources of the plurality of data channels; and a receiver that receives the plurality of data channels in the time domain resources.

According to a third aspect, there is provided an apparatus comprising: a transmitter that transmits downlink control information (DCI) scheduling a plurality of data channels, wherein the DCI contains a first indicator indicating a first time domain resource allocation pattern selected from a set of predefined time domain resource allocation patterns for time domain resources of the plurality of data channels; and a processor that performs a channel access procedure for each of the plurality of data channels; wherein the transmitter further transmits the plurality of data channels in the time domain resources in response to the channel access procedure for a corresponding data channel being successful.

According to a fourth aspect, there is provided an apparatus comprising: a receiver that receives downlink control information (DCI) scheduling a plurality of data channels, wherein the DCI contains a first indicator indicating a first time domain resource allocation pattern selected from a set of predefined time domain resource allocation patterns for time domain resources of the plurality of data channels; wherein the receiver further receives the plurality of data channels in the time domain resources.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 4A is a schematic diagram illustrating valid S and L combinations for PDSCH transmission;

FIG. 4B is a schematic diagram illustrating candidate starting positions and ending positions for normal CP for PDSCH transmission;

FIG. 4C is a schematic diagram illustrating valid S and L combinations for PUSCH transmission;

FIG. 4D is a schematic diagram illustrating candidate starting positions and ending positions for normal CP for PUSCH transmission;

FIGS. 6A-6I illustrate examples of time domain resource allocation patterns that may be scheduled by a single DCI;

FIG. 7 shows an example of a mapping table for time domain resource allocation indication in an DCI.

DETAILED DESCRIPTION

Figure 1:
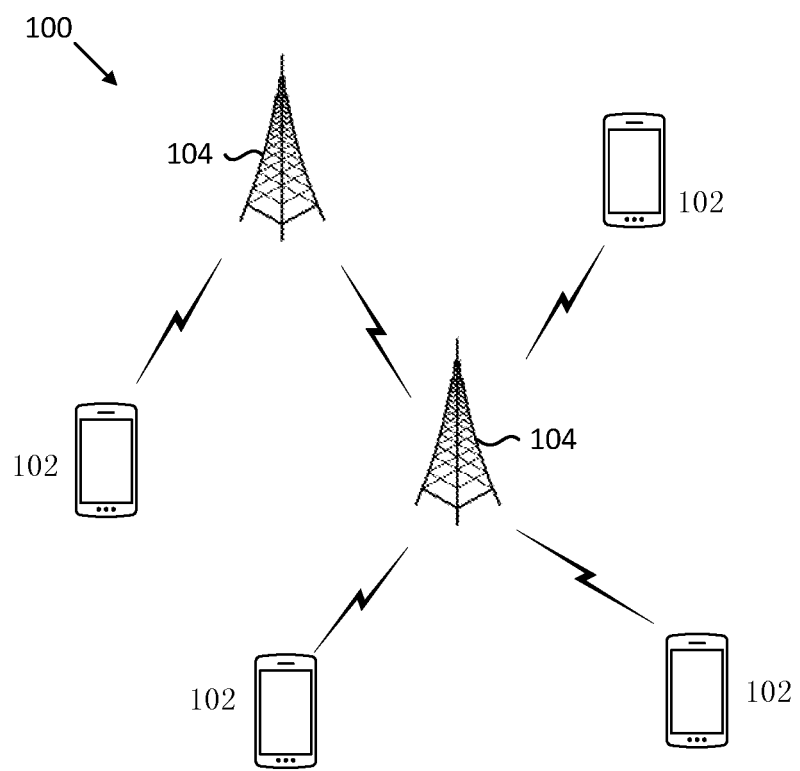
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100. In one embodiment, the wireless communication system 100 may include user equipment (UEs) 102 and network equipment (NEs) 104. Even though a specific number of UEs 102 and NEs 104 is depicted in FIG. 1, one skilled in the art will recognize that any number of UEs 102 and NEs 104 may be included in the wireless communication system 100.

The user equipment (UEs) 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

Network equipment (NEs) 104 may also be referred to as a base station, an access point, an access terminal, a base, a Node-B, an eNB, a gNB, a Home Node-B, a relay node, an apparatus, a device, or by any other terminology used in the art. Throughout this specification, a reference to base station may refer to any one of the above referenced types of the network equipment 104, such as eNB and gNB.

The network equipment 104 may be distributed over a geographic region. The network equipment 104 is generally part of a radio access network that includes one or more controllers communicably coupled to one or more corresponding network equipment 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with 3GPP 5G new radio (NR). In some implementations, the wireless communication system 100 is compliant with the 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The network equipment 104 may serve a number of UEs 102 within a serving area, for example, a cell (or a cell sector) or more cells via a wireless communication link. The network equipment 104 transmits DL communication signals to serve the UEs 102 in the time, frequency, and/or spatial domain.

Communication links are provided between the NEs 104 and the UEs 102, which may be LTE UL/DL communication links between an eNB 104a and UE 102a, 102b for example, or NR UL/DL communication links between a gNB 104b and UE102b, 102c, 102d for example. Some UEs, in this case UE 102b, may simultaneously communicate with different Radio Access Technologies (RATs), such as NR and LTE.

Direct or indirect communication link between one NE 104a and another NE 104b may also be provided.

Figure 2:
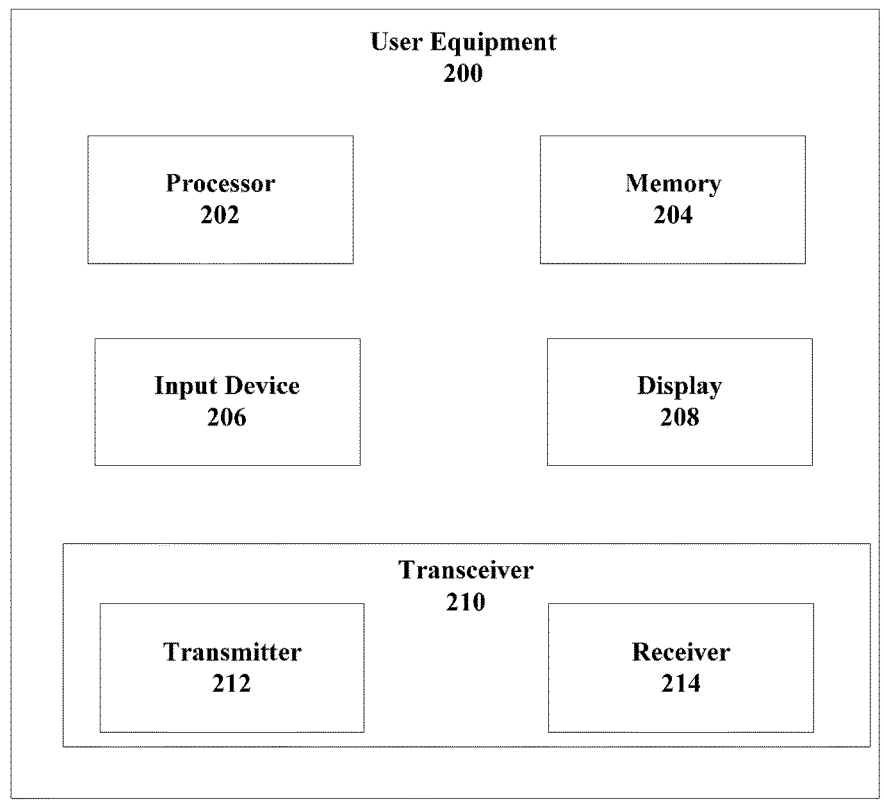
FIG. 2 is a schematic block diagram illustrating components of user equipment (UE) according to one embodiment.

FIG. 2 is a schematic block diagram illustrating components of user equipment (UE) according to one embodiment. The UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and display 208 may form a touchscreen or similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment. For example, the transmitter 212 may transmit a HARQ-ACK including feedbacks for one or more DL transmissions. As another example, the receiver 214 may receive various configurations/data from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, UE 200 includes a plurality of transmitter 212 and receiver 214 pairs for communicating on a plurality of wireless networks and/or radio frequency bands, each transmitter 212 and receiver 214 pair configured to communicate on a different wireless network and/or radio frequency band from other transmitter 212 and receiver 214 pairs.

Figure 3:
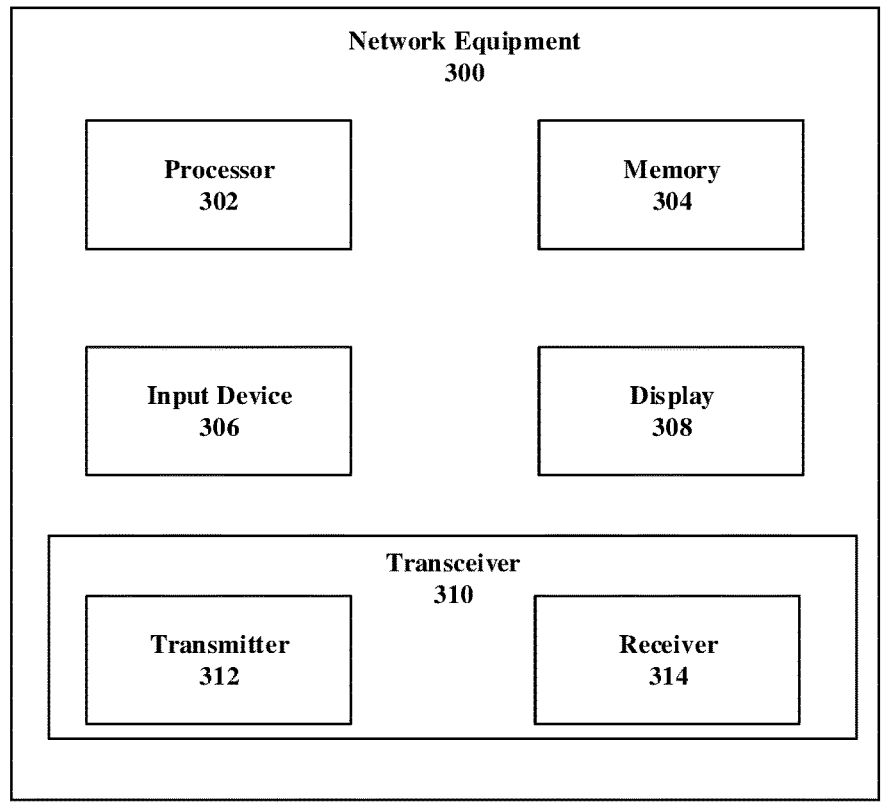
FIG. 3 is a schematic block diagram illustrating components of network equipment (NE) according to one embodiment.

FIG. 3 is a schematic block diagram illustrating components of network equipment (NE) according to one embodiment. The network equipment (NE) 300 may be an exemplary implementation of NE 104 of FIG. 1.

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals/data to UE 200. The processor 302 may also control the transceiver 310 to receive UL signals/data from UE 200. For example, the processor 302 may control the transceiver 310 to receive a HARQ-ACK including feedbacks for one or more DL transmissions. In another example, the processor 302 may control the transceiver 310 to transmit DL signals for various configurations to UE 200, as described above.

The transceiver 310, in one embodiment, is configured to communicate wirelessly with UE 200. In certain embodiments, the transceiver 310 comprises a transmitter 312 and a receiver 314. The transmitter 312 is used to transmit DL communication signals to UE 200 and the receiver 314 is used to receive UL communication signals from UE 200. For example, the receiver 314 may receive a HARQ-ACK codebook from UE 200. As another example, the transmitter 312 may transmit the various configurations/data of NE 300.

The transceiver 310 may communicate simultaneously with a plurality of UEs 200. For example, the transmitter 312 may transmit DL communication signals to UE 200. As another example, the receiver 314 may simultaneously receive UL communication signals from UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, NE 300 may serve multiple cells and/or cell sectors, wherein the transceiver 310 includes a transmitter 312 and a receiver 314 for each cell or cell sector.

In TS38.214, multiple flexible starting positions and durations for PDSCH transmission and PUSCH transmission are defined. FIG. 4A is a schematic diagram illustrating valid S and L combinations for PDSCH transmission. The corresponding starting position and ending position for PDSCH mapping Types A and B are listed in the table of FIG. 4B, for normal CP.

As shown in FIG. 4B, for normal CP, PDSCH type A has three candidate starting positions and up to 12 ending positions; PDSCH type B has up to 13 candidate starting positions and 13 candidate ending positions. It is noted that the maximum ending position is symbol 13 so that one PDSCH transmission is guaranteed not crossing slot boundary.

FIG. 4C is a schematic diagram illustrating valid S and L combinations for PUSCH transmission. The corresponding starting position and ending position for PUSCH mapping Types A and B are listed in the table of FIG. 4D, for normal CP.

As shown in FIG. 4D, for normal CP, PUSCH type A has only one starting position and up to 11 ending positions; PUSCH type B has up to 14 candidate starting positions and 14 candidate ending positions. It is noted that the maximum ending position is symbol 13 so that one PUSCH transmission is guaranteed not crossing slot boundary.

It is noted that the feature of a single UL grant schedules up to 4 PUSCHs has been supported in LTE Rel-14 eLAA. The corresponding UL grant is LTE DCI format 0A and 4A for single codeword transmission or up to two-codeword transmission, respectively.

For NR multi-slot scheduling by single UL grant with separate TB for each individual PUSCH, the maximum number of slots which can be scheduled by a single UL grant should be explicitly indicated or configured to UE by RRC signaling or implicitly derived by UE. Based on the maximum number, the payload size of the single UL grant can be determined. Assuming the maximum number of slots is determined to be N, then the payload size of the slot-specific information fields in the single UL grant shall be multiplied by N. For example, 1-bit NDI, 2-bit RV, M-bit CBGTI, . . . , shall be extended to N-bit NDI, 2*N-bit RV and M*N-bit CBGTI in the single UL grant, respectively, wherein M is the RRC configured maximum number of CBGs per TB. Some information fields in the single UL grant, e.g., BWP indicator, frequency domain resource assignment, MCS, time domain resource assignment, etc., can be set to common for the scheduled multiple slots in order to save signaling overhead.

Similarly, multiple mini-slots scheduling by a single UL grant with separate TB for each individual PUSCH also needs to determine the maximum number of mini-slots which can be scheduled by the single UL grant. In addition, Rel-15 time domain resource allocation field may not support enough starting positions and durations for multiple contiguous PUSCHs in multiple mini-slots. Furthermore, if the field of time domain resource assignment is set to common for the scheduled multiple mini-slots, there may be some problems for NR-U uplink transmission.

FIGS. 5A-5E illustrate examples of multiple mini-slots scheduled by a single UL grant for multiple UL transmissions with front-loaded UL Demodulation Reference Signal (DMRS) in each mini-slot. Alternatively, FIGS. 5A-5E illustrate examples of multiple mini-slots scheduled by a single DL grant for multiple DL transmissions with front-loaded DL DMRS in each mini-slot.

Figure 5A:
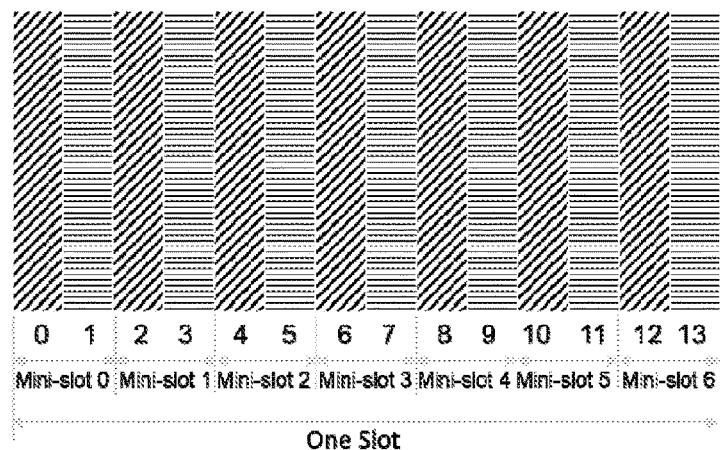
FIGS. 5A-5E illustrate examples of multiple mini-slots scheduled by a single UL/DL grant for multiple UL/DL transmissions with front-loaded UL/DL Demodulation Reference Signal (DMRS) in each mini-slot.

FIG. 5A shows one example where seven contiguous mini-slots are scheduled by a single UL grant to equally occupy one full slot. The starting symbol and ending symbol for each scheduled mini-slot are different from the others.

Figure 5B:
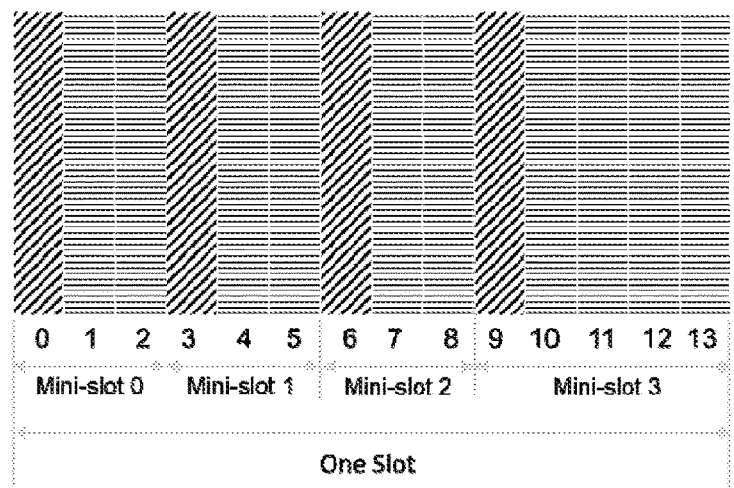
Figure 5C:
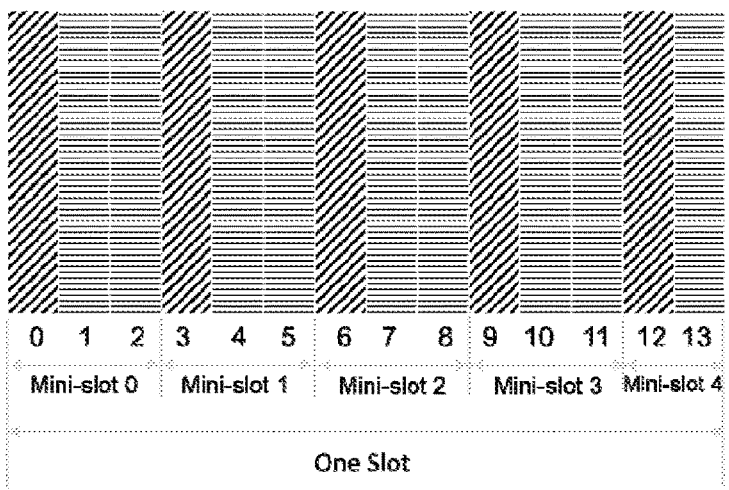

In some cases, the durations for the multiple scheduled mini-slots may be different. FIG. 5B shows four mini-slots scheduled by a single UL grant, and FIG. 5B shows five mini-slots scheduled by a single UL grant. As shown in FIGS. 5B and 5C, the last mini-slot has different duration compared to the other scheduled mini-slots.

Figure 5D:
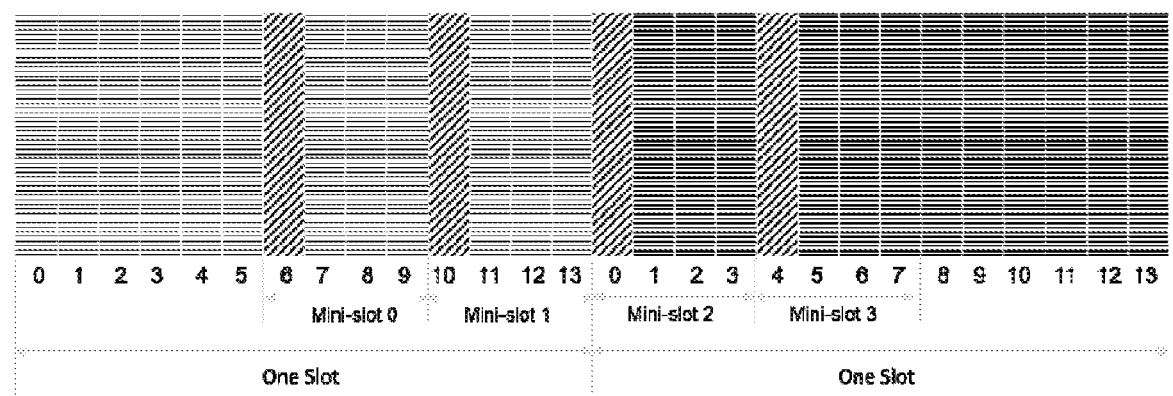
Figure 5E:
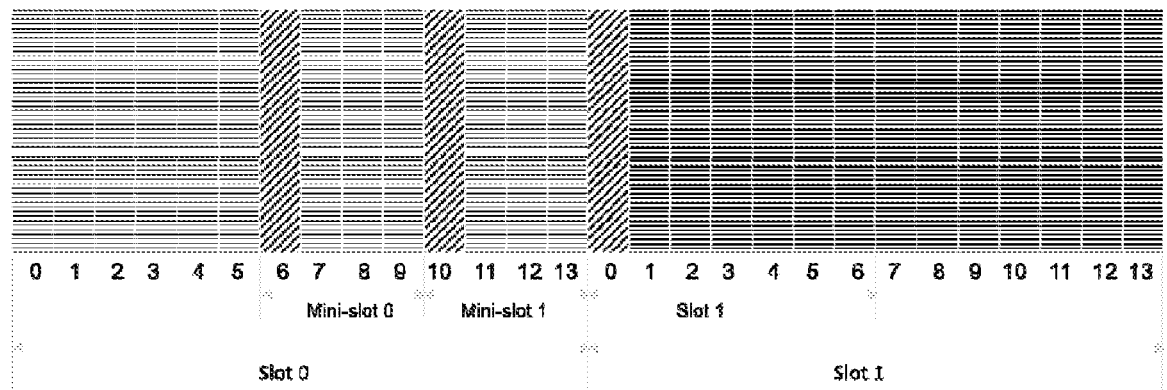

Furthermore, the multiple scheduled mini-slots may cross the slot boundary as shown in FIGS. 5D and 5E. FIG. 5D shows four mini-slots scheduled by a single UL grant. FIG. 5E shows two mini-slots and one slot scheduled by a single UL grant. On the other hand, the multiple PUSCHs scheduled by a single UL grant may include PUSCH Type A and Type B in the same slot or contiguous slots. Such scheduling options provide enough flexibility for NR-U uplink.

Regarding UL transmission, due to unpredictability of UL LBT, UE cannot know the actual starting position for a PUSCH and may transmit a punctured PUSCH based on the LBT outcome and allowed candidate starting positions. However, such punctured PUSCH inevitably leads to higher decoding failure rate and performance loss. In addition, if the front-loaded DMRS is punctured, gNB may not detect the existence of PUSCH transmission and channel estimation for further processing the PUSCH. Therefore, a straightforward way is to schedule multiple mini-slot based PUSCHs in the initial slot of UE acquired COT and then schedule slot-based PUSCH in the following slot of the COT. In that sense, if LBT for one mini-slot is successful, then UE shall transmit the prepared PUSCH on it; otherwise, UE just drops the prepared PUSCH or attempts to transmit it in next mini-slot. Scheduling the multiple mini-slots by a single UL grant may greatly reduce the signaling overhead. However, the problem of time domain resource allocation for the multiple contiguous mini-slots also needs to be resolved.

In TS38.214, default PUSCH time domain resource allocation is specified, which include details defining which PUSCH time domain resource allocation configuration to apply. Either a default PUSCH time domain allocation or the higher layer configured pusch-AllocationList in pusch-ConfigCommon or pusch-Config may be applied.

Definitions of the subcarrier spacing specific values j based on $\mu_{PUSCH}$, where $\mu_{PUSCH}$ is the subcarrier spacing configurations for PUSCH, are also provided. The value of j is used in determination of $K_2$ for normal CP or extended CP.

In TS38.331, the PUSCH time domain resource allocation is defined as below:

```
PUSCH-TimeDomainResourceAllocation ::= SEQUENCE {
    k2 INTEGER(0..32) OPTIONAL, -- Need S
    mappingType ENUMERATED {typeA, typeB},
    startSymbolAndLength INTEGER (0..127)
}
```

The IE (information element) PUSCH-TimeDomainResourceAllocation is used to configure a time domain relation between PDCCH and PUSCH. PUSCH-TimeDomainResourceAllocationList contains one or more of such PUSCH-TimeDomainResourceAllocations. The network indicates in the UL grant which of the configured time domain allocations the UE shall apply for that UL grant. The UE determines the bit width of the DCI field based on the number of entries in the PUSCH-TimeDomainResourceAllocationList. Value 0 in the DCI field refers to the first element in this list, value 1 in the DCI field refers to the second element in this list, and so on.

The field k2 is an integer value indicating slot offset. If the field is absent, the UE applies the value 1 when PUSCH SCS is 15/30 KHz; 2 when PUSCH SCS is 60 KHz and 3 when PUSCH SCS is 120 KHz.

The PUSCH mapping type is set to Type A or Type B.

The field startSymbolAndLength is an index giving valid combinations of start symbol and length (jointly encoded) as start and length indicator (SLIV). The network configures the field so that the allocation does not cross the slot boundary.

The starting symbol S relative to the start of the slot, and the number of consecutive symbols L counting from the symbol S allocated for the PUSCH are determined from the start and length indicator SLIV of the indexed row:

```
if (L−1) ≤ 7 then
    SLIV = 14·(L−1) + S
else
    SLIV = 14·(14−L+1)+(14−1−S)
    where 0 < L ≤ 14 − S .
```

Several solutions for multiple mini-slots scheduled by a single DCI are proposed for NR access on unlicensed spectrum (NR-U) in this disclosure. According to some embodiments of the disclosure, a list of time domain resource allocation (TDRA) patterns is configured by RRC signalling and each of the TDRA patterns includes at least k2 value, mapping type, and starting symbol index and length. One code point of time domain resource assignment in the DCI indicates one TDRA pattern. Dependent on the mapping relationship between the code point and the corresponding TDRA pattern, a single DCI can schedule a single PUSCH in one slot or mini-slot or schedule multiple PUSCHs in multiple contiguous or non-contiguous slots/mini-slots.

Some of the proposed TDRA patterns are based on the following design principles:
 a) The configured TDRA patterns can support different number of PUSCHs scheduled by the DCI;
 b) The configured TDRA patterns can support multiple PUSCHs with different starting symbols and/or lengths;
 c) The configured TDRA patterns can support multiple contiguous or non-contiguous PUSCHs in slots or mini-slots;
 d) The configured TDRA patterns can support multiple PUSCHs with same or different mapping types;
 e) The configured TDRA patterns can support multiple PUSCHs in different slots;
 f) The configured TDRA patterns can explicitly or implicitly indicate the number of scheduled PUSCHs; and/or
 g) The configured TDRA patterns can indicate TDRA for a single PUSCH and TDRA for multiple PUSCHs.

The disclosure provides a list of time domain resource allocation patterns configured by RRC signalling and the TDRA patterns support different number of PUSCHs scheduled in same slot or contiguous or non-contiguous slots/mini-slots, with same or different mapping types, with same or different lengths. One code point of time domain resource assignment in the DCI indicates one TDRA pattern. Benefits of the arrangement may include full scheduling flexibility and no extra signalling overhead for time domain resource assignment in DCI which avoids PUSCH-specific time domain resource assignment field in DCI.

FIGS. 6A-6I illustrate examples of time domain resource allocation patterns that may be scheduled by a single DCI. FIG. 6A shows the TDRA pattern for a single PUSCH scheduling. FIGS. 6B-6I show different TDRA patterns for multiple PUSCH scheduling.

According to some embodiments of the disclosure, there is provided an apparatus 200 comprising: a receiver 214 that receives downlink control information (DCI) scheduling a plurality of data channels, wherein the DCI contains a first indicator indicating a first time domain resource allocation pattern selected from a set of predefined time domain resource allocation patterns for time domain resources of the plurality of data channels; a processor 202 that performs a channel access procedure for each of the plurality of data channels; and a transmitter 212 that transmits the plurality of data channels in the time domain resources in response to the channel access procedure for a corresponding data channel being successful.

According to some other embodiments of the disclosure, there is provided an apparatus 300 comprising: a transmitter 312 that transmits downlink control information (DCI) scheduling a plurality of data channels, wherein the DCI contains a first indicator indicating a first time domain resource allocation pattern selected from a set of predefined time domain resource allocation patterns for time domain resources of the plurality of data channels; and a receiver 314 that receives the plurality of data channels in the time domain resources.

The set of predefined time domain resource allocation patterns may be configured by radio resource control (RRC) signaling.

In some embodiments, the set of predefined time domain resource allocation patterns includes at least one time domain resource allocation pattern indicating a single time domain resource for a single data channel, as shown in FIG. 6A.

For multiple PUSCH scheduling, RRC signaling configures multiple TDRA patterns to support different number of PUSCHs scheduled in same slot or contiguous or non-contiguous slots, with same or different mapping types, with same or different lengths.

For one TDRA pattern supporting N PUSCHs scheduled by one DCI, the value of k2_x indicates the slot level offset between the slot where the DCI is received and the slot where the $x^{th}$ PUSCH is scheduled.

Same or different mapping types can be supported by setting same or different mappingType_x value for the $x^{th}$ scheduled PUSCH.

The startSymbolAndLength_x indicates the starting symbol index and duration of the $x^{th}$ scheduled PUSCH, which can be set to appropriate values so as to support contiguous PUSCHs, i.e., the starting symbol of the $x^{th}$ scheduled PUSCH should immediately follow the ending symbol of the $(x-1)^{th}$ scheduled PUSCH so as to ensure time contiguous scheduling.

For example, as shown in FIG. 5A, to support 7 contiguous PUSCHs scheduled in one slot, the value of startSymbolAndLength for the first PUSCH is 14 indicating the starting symbol is 0 and length is 2; the value of startSymbolAndLength for the second PUSCH is 16 indicating the starting symbol is 2 and length is 2; the value of startSymbolAndLength for the third PUSCH is 18 indicating the starting symbol is 4 and length is 2; the value of startSymbolAndLength for the fourth PUSCH is 20 indicating the starting symbol is 6 and length is 2; the value of startSymbolAndLength for the fifth PUSCH is 22 indicating the starting symbol is 8 and length is 2; the value of startSymbolAndLength for the sixth PUSCH is 24 indicating the starting symbol is 10 and length is 2; the value of startSymbolAndLength for the seventh PUSCH is 26 indicating the starting symbol is 12 and length is 2.

For N PUSCHs scheduled by the single DCI, the below TDRA pattern can be defined as one example:

PUSCH-TimeDomainResourceAllocationList::=SEQUENCE
(SIZE(1 . . . maxNrofUL-Allocations)) OF PUSCH-TimeDomainResourceAllocation.

In some embodiments, a total number of elements in the set of predefined time domain resource allocation patterns determines a size of the first indicator.

For example, the first time domain resource allocation pattern may comprise separate fields of slot level offset, mapping type, starting symbol and length, for each of the plurality of data channels, wherein a number of each type of fields is same and indicates a total number of the plurality of data channels. FIG. 6B shows an example on support of different slots, mapping types and different lengths. The example provides full scheduling flexibility which supports different number of scheduled PUSCHs in different contiguous or non-contiguous slots/mini-slots, different mapping types, different starting symbols and different lengths. The value of the N determines the number of scheduled PUSCHs.

In another example, the first time domain resource allocation pattern may comprise a single field of slot level offset, and separate fields of mapping type, starting symbol and length, for each of the plurality of data channels, wherein a total number of the field of mapping type is same as a total number of the field of starting symbol and length, and indicates a total number of the plurality of data channels. FIG. 6C shows an example on support of different mapping types and different lengths. This example can support different number of PUSCHs scheduled in same slot or in contiguous slots with first slot indicated by k2, different mapping types, different starting symbols and different lengths. The value of the N determines the number of scheduled PUSCHs.

In a further example, the first time domain resource allocation pattern may comprise a single field of slot level offset, a single field of mapping type, and separate fields of starting symbol and length for each of the plurality of data channels, wherein a total number of the fields of starting symbol and length indicates a total number of the plurality of data channels. FIG. 6D shows an example on support of same mapping types and different lengths. This example can support different number of PUSCHs scheduled in same slot or in contiguous slots with first slot indicated by k2, same mapping types, different starting symbols and different lengths. The value of the N determines the number of scheduled PUSCHs.

In a yet further example, the first time domain resource allocation pattern may comprise a single field of slot level offset, a single field of mapping type, and a single field of starting symbol and length for a first scheduled data channel of the plurality of data channels, and a field indicating a total number of the plurality of data channels. FIG. 6E shows an example on support of contiguous PUSCHs, same mapping types and same length. Each of the plurality of data channels has a same length as the first scheduled data channel of the plurality of data channels. The plurality of data channels are contiguous in time domain. Shown in FIG. 6E, the "startSymbolAndLength_1" indicates the starting symbol and length of the first scheduled PUSCH and "numberOfScheduledPUSCHs" indicates the number of scheduled PUSCHs with same lengths for the PUSCHs. "Maximum number of scheduled PUSCHs" is the maximum number of PUSCHs scheduled by single DCI, which is configured by RRC signaling. This example can support different number of PUSCHs scheduled in same slot or in contiguous slots with first slot indicated by k2, same mapping types, different starting symbols and same length.

In a yet further example, the first time domain resource allocation pattern may comprise a single field of slot level offset, a single field of mapping type, a single field of starting symbol for a first scheduled data channel of the plurality of data channels and a total length for all the scheduled data channels of the plurality of data channels, and a field indicating a total number of the plurality of data channels. A length of each of the plurality of data channels is equal to the total length divided by the total number of the plurality of data channels. FIG. 6F shows an example on support of contiguous PUSCHs, same mapping types and same length. The field "startSymbolAndLength" indicates the starting symbol of the first scheduled PUSCH and total length of the scheduled PUSCHs, and "numberOfScheduledPUSCHs" indicates the number of scheduled PUSCHs. "Maximum number of scheduled PUSCHs" is the maximum number of PUSCHs scheduled by a single DCI, which is configured by RRC signaling. Accordingly, the length of each PUSCH is equal to the total length divided by the number of scheduled PUSCHs. This example can support different number of PUSCHs scheduled in same slot or in contiguous slots with first slot indicated by k2, same mapping types, different starting symbols and same length.

In a yet further example, the first time domain resource allocation pattern may comprise a single field of slot level offset, a single field of mapping type, fields of starting symbol for each of the plurality of data channels, and a single field indicating same length for each of the plurality of data channels. FIG. 6G shows an example on support of contiguous or non-contiguous PUSCHs, same mapping types and same length. The field "startSymbol_x" indicates the starting symbol of the $x^{th}$ scheduled PUSCH and "length" indicates the length for each of the scheduled PUSCHs. The number of the startSymbol_x fields determines the number of scheduled PUSCHs. This example can support different number of PUSCHs scheduled in same slot or in contiguous slots with first slot indicated by k2, same mapping types, different starting symbols and same length. The value of the N determines the number of scheduled PUSCHs.

In a yet further example, the first time domain resource allocation pattern may comprise a single field of slot level offset, a single field of mapping type, separate fields of starting symbol for each of the plurality of data channels, and a single field indicating length for a last scheduled data channel of the plurality of data channels. FIG. 6H shows an example on support of contiguous PUSCHs, same mapping types and same or different lengths. The field "startSymbol_x" indicates the starting symbol of the $x^{th}$ scheduled PUSCH. The offset between the startSymbol_x and the startSymbol_(x+1) determines the length of the $x^{th}$ scheduled PUSCH. "length_N" indicates the length for the last scheduled PUSCHs, i.e., the $N^{th}$ PUSCH. Alternatively, the pattern without "length_N" indicates the last scheduled PUSCHs, i.e., the $N^{th}$ PUSCH, does not cross the slot boundary. This example can support different number of contiguous PUSCHs scheduled in same slot indicated by k2, same mapping type, different starting symbols and same or different length. The value of the N determines the number of scheduled PUSCHs.

In a yet further example, the first time domain resource allocation pattern may comprise separate fields of slot level offset, a single field of mapping type, a single field of starting symbol and length, for each of the plurality of data channels, and a total number of the field of slot level offset indicates a total number of the plurality of data channels. FIG. 6I shows an example on support of contiguous or non-contiguous PUSCHs, same mapping types and same length. The field "k2_x" indicates the slot level offset for the $x^{th}$ scheduled PUSCH and "startSymbolAndLength" indicates the starting symbol and length for each of the scheduled PUSCHs. The value of the N determines the number of scheduled PUSCHs. This example can support different number of PUSCHs scheduled in contiguous or non-contiguous slots, same mapping types, different starting symbols and same length. Alternatively, "startSymbolAndLength" can indicate the starting symbol for the first scheduled PUSCH and length for the last scheduled PUSCH. So the scheduled PUSCHs are contiguous in time domain.

For DL transmissions, the time domain resource allocation pattern shown in each of FIGS. 6A-6I may be adapted, by replacing k2 with k0, for configuring PDSCH-TimeDomainResourceAllocation to support single or multiple PDSCH scheduling.

FIG. 7 shows an example of mapping table for time domain resource allocation indication in a DCI. DCI Format 0_0 and Format 0_1 are used for the scheduling of PUSCHs in one cell, and may contain a field of time domain resource assignment taking 0 to 4 bits. This field carries the row index of the items in PUSCH-TimeDomainResourceAllocationList in RRC. The number of Bit Length is determined by log(I,2), where I is the number of elements in PUSCH-TimeDomainResourceAllocationList in RRC.

By predefined PUSCH-TimeDomainResourceAllocation in the list, gNB can dynamically and flexibly indicate the number of scheduled PUSCHs, time domain resource allocation and mapping type for each scheduled PUSCH by means of pointing the field of the time domain resource assignment to the corresponding code point.

Alternatively, for multiple-PDSCH scheduling by a single DL grant, similar mapping table for time domain resource allocation indication in DCI format 1_0 or 1_1 is used for the scheduling of PDSCHs in one cell, and may contain a field of time domain resource assignment taking 0 to 4 bits. The field carries the row index of the items in PDSCH_TimeDomainResourceAllocationList in RRC. The number of Bit Length is determined by log(I,2), where I is the number of elements in PDSCH-TimeDomainResourceAllocationList in RRC. By predefined PDSCH-TimeDomainResourceAllocation in the list, gNB can dynamically and flexibly indicate the number of scheduled PDSCHs, time domain resource allocation and mapping type for each scheduled PDSCH by means of pointing the field of the time domain resource assignment to the corresponding code point.

The IE PDSCH-TimeDomainResourceAllocation is used to configure a time domain relation between PDCCH and PDSCH. The PDSCH-TimeDomainResourceAllocationList contains one or more of such PDSCH-TimeDomainResourceAllocations. The network indicates in the DL assignment which of the configured time domain allocations the UE shall apply for that DL assignment. The UE determines the bit width of the DCI field based on the number of entries in the PDSCH-TimeDomainResourceAllocationList. Value 0 in the DCI field refers to the first element in this list, value 1 in the DCI field refers to the second element in this list, and so on.

For example, the PDSCH time domain resource allocation may be defined by:

```
PDSCH-TimeDomainResourceAllocationList ::+= SEQUENCE
(SIZE(1..maxNrofDL-Allocations)) OF PDSCH-
TimeDomainResourceAllocation
  PDSCH-TimeDomainResourceAllocation::=SEQUENCE{
  k0 INTEGER(0..32),
  mappingType ENUMERATED {typeA, typeB},
  startSymbolAndLength INTEGER (0..127)
  },
``` wherein, "k0" is slot offset between DCI and its scheduled PDSCH. When the field is absent the UE applies the value 0. "mappingType" is PDSCH mapping type. "startSymbolAndLength" is an index giving valid combinations of start symbol and length (jointly encoded) as start and length indicator (SLIV). The network configures the field so that the allocation does not cross the slot boundary.

Based on the aforementioned methods for supporting multiple PUSCH scheduling by single UL grant, the similar methods can also be used for configuring PDSCH-TimeDomainResourceAllocation to support single or multiple PDSCH scheduling by replacing k2 with k0.

According to some embodiments of the disclosure, a maximum number of the plurality of data channels which can be scheduled by the DCI is configured by RRC signaling.

According to some embodiments of the disclosure, a maximum number of the transport blocks (TBs) which can be scheduled by the DCI is configured by RRC signaling. The maximum number of TBs determines a bit field length of a second indicator in the DCI and the second indicator indicates a number of actually scheduled TBs.

Considering there may be slot-level scheduling and mini-slot level scheduling by a single DCI, it does make sense to use RRC signaling to configure the maximum number of TBs which can be scheduled by the DCI. Based on the configured maximum TB number, UE can derive the DCI payload size.

The maximum number of scheduled TBs determines the number of bits in the DCI for dynamically indicating the possible number of scheduled TBs. E.g., assuming maximum N TBs can be scheduled a single DCI, then $\lceil \log 2(N) \rceil$ bits are needed in DCI.

For TB-specific information, there are N bits for NDI, 2*N bits for RV, N bits for UL-SCH indicator and N*M bits for CBGTI if CBG-based retransmission is configured and M is the RRC configured maximum number of CBGs per TB.

In an example, the first indicator indicates a time domain resource for the first scheduled data channel of the plurality of data channels and a time domain resource for the second scheduled data channel of the plurality of data channels contiguously following time domain resource for the first scheduled data channel of the plurality of data channels, and the first scheduled data channel and the second scheduled data channel of the plurality of data channels have a same length.

The field of time-domain resource assignment indicates the slot, the starting symbol and length for the first scheduled PUSCH. Then the second scheduled PUSCH contiguously follows the first one with same duration and mapping type. Then the third one contiguously follow the second one with same duration and mapping type. Then the fourth one . . . until the number of PUSCHs equals to the dynamically indicated number of TBs. In this way, the last scheduled PUSCH may be within the same slot with the first scheduled PUSCH or cross the slot boundary. The restriction is all the scheduled PUSCHs should have same duration and same mapping type.

In another example, the first indicator indicates a starting symbol for the first scheduled data channel of the plurality of data channels and a total length for all the scheduled data channels of the plurality of data channels.

The field of time-domain resource assignment indicates the slot, the starting symbol for the first scheduled PUSCH and the total duration for all the scheduled PUSCHs. Then the duration for each PUSCH is equal to the total duration divided by the number of scheduled TBs. If the total duration cannot be divided by the number of the scheduled TBs then the remaining symbols are contained in the last scheduled PUSCH. As shown in FIG. 5B, for example, assuming the total duration is 14 symbols and 4 TBs are scheduled, then the first three PUSCHs have duration of 3 symbols and the last one has 5 symbols. Therefore, the $x^{th}$ scheduled PUSCH contiguously follows the $(x-1)^{th}$ scheduled PUSCH with same mapping type. The restriction is all the scheduled PUSCHs should have same mapping type or within the same slot.

In some embodiments, considering UE processing complexity and LBT risk, UE may not need to prepare all the scheduled PUSCHs after detecting the DCI scheduling multiple PUSCHs. UE can prepare the first several PUSCHs and transmit them based on LBT for each prepared PUSCH. If LBT for one PUSCH is successful, then UE shall transmit the PUSCH; otherwise, UE shall attempt to transmit the prepared PUSCH in next mini-slot.

In this way, gNB can dynamically and flexibly control the number of scheduled PUSCHs by single UL grant and save the signaling overhead.

The above systems, apparatus, and/or methods may be readily adaptable for DL transmissions, i.e., using single DL grant scheduling multiple contiguous PDSCHs in multiple mini-slots in the initial slot of one gNB-acquired COT.

According to some embodiments of the disclosure, there is provided an apparatus 300 comprising: a transmitter 312 that transmits downlink control information (DCI) scheduling a plurality of data channels, wherein the DCI contains a first indicator indicating a first time domain resource allocation pattern selected from a set of predefined time domain resource allocation patterns for time domain resources of the plurality of data channels; and a processor 302 that performs a channel access procedure for each of the plurality of data channels; wherein the transmitter 312 further transmits the plurality of data channels in the time domain resources in response to the channel access procedure for a corresponding data channel being successful.

According to some embodiments of the disclosure, there is provided apparatus 200 comprising: a receiver 214 that receives downlink control information (DCI) scheduling a plurality of data channels, wherein the DCI contains a first indicator indicating a first time domain resource allocation pattern selected from a set of predefined time domain resource allocation patterns for time domain resources of the plurality of data channels; wherein the receiver 214 further receives the plurality of data channels in the time domain resources.

Figure 8A:
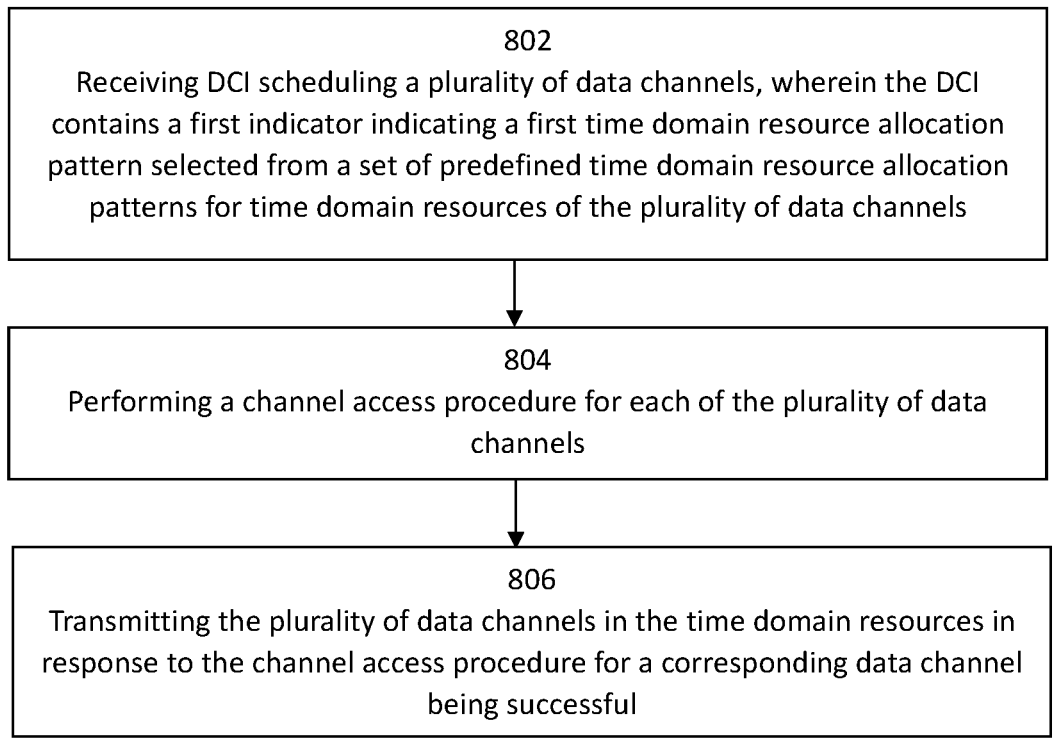
FIGS. 8A-8D are flow diagrams illustrating steps of Multi-TTI scheduling.

FIGS. 8A-8D are flow diagrams illustrating steps Multi-TTI scheduling. FIG. 8A shows a flow diagram of a method performed by a UE for multiple UL transmissions, i.e., Multi-TTI PUSCH scheduling.

In step 802, the receiver receives DCI scheduling a plurality of data channels, wherein the DCI contains a first indicator indicating a first time domain resource allocation pattern selected from a set of predefined time domain resource allocation patterns for time domain resources of the plurality of data channels.

In step 804, the processor performs a channel access procedure for each of the plurality of data channels.

In step 806, the transmitter transmits the plurality of data channels in the time domain resources in response to the channel access procedure for a corresponding data channel being successful.

Figure 8B:
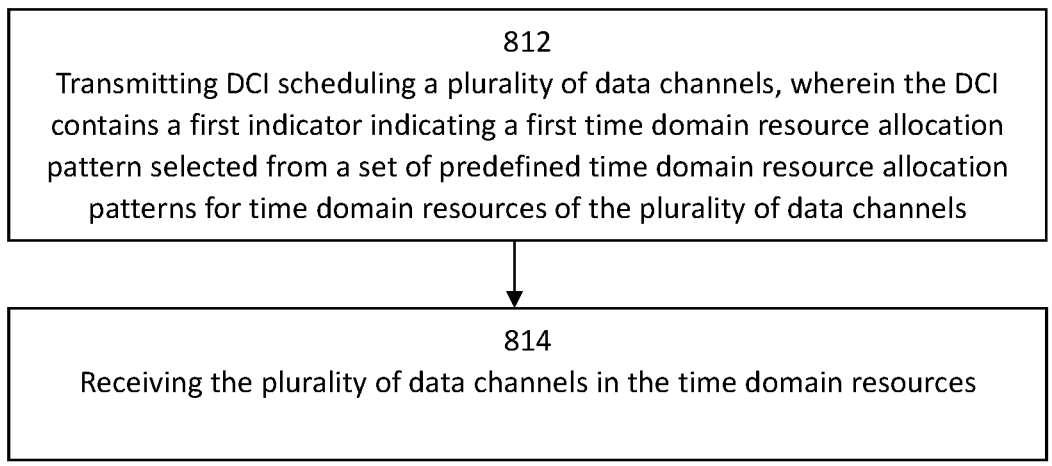

FIG. 8B shows a flow diagram of a method performed by an NE or base station for multiple UL transmissions, i.e., Multi-TTI PUSCH scheduling.

In step 812, the transmitter transmits DCI scheduling a plurality of data channels, wherein the DCI contains a first indicator indicating a first time domain resource allocation pattern selected from a set of predefined time domain resource allocation patterns for time domain resources of the plurality of data channels.

In step 814, the receiver receives the plurality of data channels in the time domain resources.

Figure 8C:
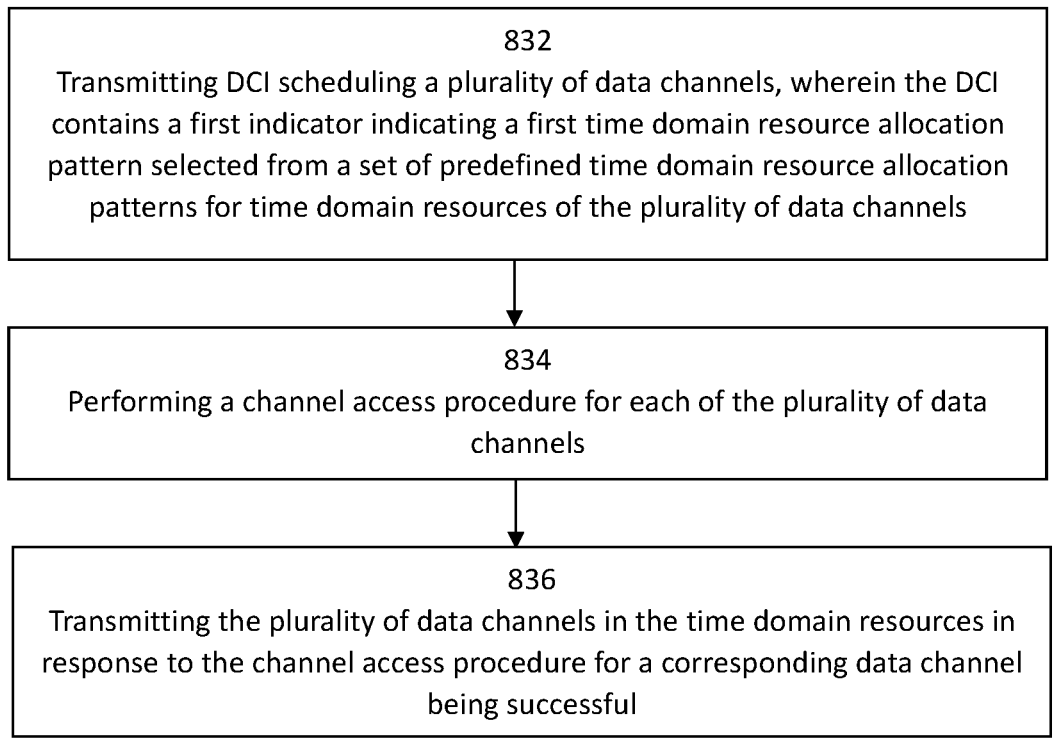

FIG. 8C shows a flow diagram of a method performed by an NE or base station for multiple DL transmissions, i.e., Multi-TTI PDSCH scheduling.

In step 832, the transmitter transmits DCI scheduling a plurality of data channels, wherein the DCI contains a first indicator indicating a first time domain resource allocation pattern selected from a set of predefined time domain resource allocation patterns for time domain resources of the plurality of data channels.

In step 834, the processor performs a channel access procedure for each of the plurality of data channels.

In step 836, the transmitter transmits the plurality of data channels in the time domain resources in response to the channel access procedure for a corresponding data channel being successful.

Figure 8D:
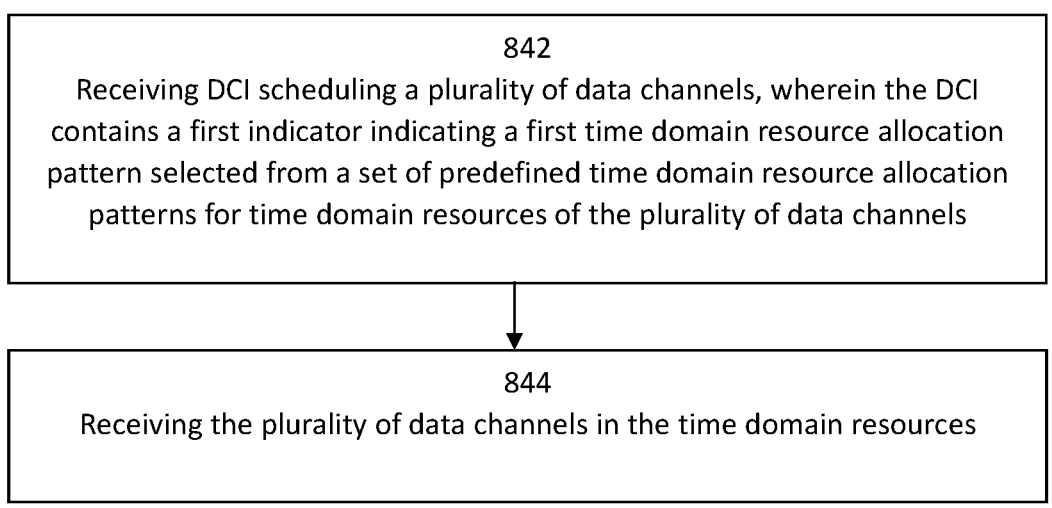

FIG. 8D shows a flow diagram of a method performed by a UE for multiple DL transmissions, i.e., Multi-TTI PDSCH scheduling.

In step 842, the receiver receives DCI scheduling a plurality of data channels, wherein the DCI contains a first indicator indicating a first time domain resource allocation pattern selected from a set of predefined time domain resource allocation patterns for time domain resources of the plurality of data channels.

In step 844, the receiver receives the plurality of data channels in the time domain resources.

The above disclosed time resource allocation patterns and configurations relating to FIGS. 6A-7 may be applied to the methods of FIG. 8A-8D, with or without modifications.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE), comprising:
at least one memory; and
at least one processor coupled with the at least one memory and configured to cause the UE to:
receive downlink control information (DCI) scheduling a plurality of data channels, wherein the DCI contains a first indicator indicating a first time domain resource allocation pattern selected from a set of predefined time domain resource allocation patterns for time domain resources of the plurality of data channels, and wherein the set of predefined time domain resource allocation patterns is configured by radio resource control (RRC) signaling, and the first time domain resource allocation pattern comprises a single field for slot level offset, and separate fields for mapping type, starting symbol, and length, for each of the plurality of data channels;
perform a channel access procedure for each of the plurality of data channels; and
transmit the plurality of data channels in the time domain resources in response to the channel access procedure for a corresponding data channel being successful.

2. The UE of claim 1, wherein the set of predefined time domain resource allocation patterns is configured by radio resource control signaling.

3. The UE of claim 1, wherein the set of predefined time domain resource allocation patterns includes at least one time domain resource allocation pattern indicating a single time domain resource for a single data channel.

4. The UE of claim 1, wherein a total number of elements in the set of predefined time domain resource allocation patterns determines a size of the first indicator.

5. The UE of claim 1, wherein the first time domain resource allocation pattern comprises separate fields of slot level offset, mapping type, starting symbol and length, for each of the plurality of data channels, wherein a number of each type of fields is same and indicates a total number of the plurality of data channels.

6. The UE of claim 1, wherein the first time domain resource allocation pattern comprises a single field of slot level offset, and separate fields of mapping type, starting symbol and length, for each of the plurality of data channels, wherein a total number of the field of mapping type is same as a total number of the field of starting symbol and length, and indicates a total number of the plurality of data channels.

7. The UE of claim 1, wherein the first time domain resource allocation pattern comprises a single field of slot level offset, a single field of mapping type, and separate fields of starting symbol and length for each of the plurality of data channels, wherein a total number of the fields of starting symbol and length indicates a total number of the plurality of data channels.

8. The UE of claim 1, wherein the first time domain resource allocation pattern comprises a single field of slot level offset, a single field of mapping type, and a single field of starting symbol and length for a first scheduled data channel of the plurality of data channels, and a field indicating a total number of the plurality of data channels.

9. The UE of claim 1, wherein the first time domain resource allocation pattern comprises a single field of slot level offset, a single field of mapping type, a single field of starting symbol for a first scheduled data channel of the plurality of data channels and a total length for all the scheduled data channels of the plurality of data channels, and a field indicating a total number of the plurality of data channels.

10. The UE of claim 1, wherein the first time domain resource allocation pattern comprises a single field of slot level offset, a single field of mapping type, fields of starting symbol for each of the plurality of data channels, and a single field indicating same length for each of the plurality of data channels.

11. The UE of claim 1, wherein the first time domain resource allocation pattern comprises a single field of slot level offset, a single field of mapping type, separate fields of starting symbol for each of the plurality of data channels, and a single field indicating length for a last scheduled data channel of the plurality of data channels.

12. The UE of claim 1, wherein the first time domain resource allocation pattern comprises separate fields of slot level offset, a single field of mapping type, a single field of starting symbol and length, for each of the plurality of data channels, and a total number of the field of slot level offset indicates a total number of the plurality of data channels.

13. The UE of claim 1, wherein the first indicator indicates a time domain resource for a first scheduled data channel of the plurality of data channels and a time domain resource for a second scheduled data channel of the plurality of data channels contiguously following time domain resource for the first scheduled data channel of the plurality of data channels, and the first scheduled data channel and the second scheduled data channel of the plurality of data channels have a same length.

14. The UE of claim 1, wherein the first indicator indicates a starting symbol for a first scheduled data channel of the plurality of data channels and a total length for all the scheduled data channels of the plurality of data channels.

15. A base station, comprising:
at least one memory; and
at least one processor coupled with the at least one memory and configured to cause the base station to:
transmit downlink control information (DCU) scheduling a plurality of data channels, wherein the DCI contains a first indicator indicating a first time domain resource allocation pattern selected from a set of predefined time domain resource allocation patterns for time domain resources of the plurality of data channels, and wherein the set of predefined time domain resource allocation patterns is configured by radio resource control (RRC) signaling, and the first time domain resource allocation pattern comprises a single field for slot level offset, and separate fields for mapping type, starting symbol, and length, for each of the plurality of data channels; and
receive the plurality of data channels in the time domain resources.

16. The base station of claim 15, wherein the set of predefined time domain resource allocation patterns is configured by radio resource control signaling.

17. The base station of claim 15, wherein the set of predefined time domain resource allocation patterns includes at least one time domain resource allocation pattern indicating a single time domain resource for a single data channel.

18. The base station of claim 15, wherein a total number of elements in the set of predefined time domain resource allocation patterns determines a size of the first indicator.

19. A processor for wireless communication, comprising:
at least one controller coupled with at least one memory and configured to cause the processor to:
receive downlink control information (DCI) scheduling a plurality of data channels, wherein the DCI contains a first indicator indicating a first time domain resource allocation pattern selected from a set of predefined time domain resource allocation patterns for time domain resources of the plurality of data channels, and wherein the set of predefined time domain resource allocation patterns is configured by radio resource control (RRC) signaling, and the first time domain resource allocation pattern comprises a single field for slot level offset, and separate fields for mapping type, starting symbol, and length, for each of the plurality of data channels;
perform a channel access procedure for each of the plurality of data channels; and
transmit the plurality of data channels in the time domain resources in response to the channel access procedure for a corresponding data channel being successful.

20. A method performed by a user equipment (UE), the method comprising:
receiving downlink control information (DCI) scheduling a plurality of data channels, wherein the DCI contains a first indicator indicating a first time domain resource allocation pattern selected from a set of predefined time domain resource allocation patterns for time domain resources of the plurality of data channels, and wherein the set of predefined time domain resource allocation patterns is configured by radio resource control (RRC) signaling, and the first time domain resource allocation pattern comprises a single field for slot level offset, and separate fields for mapping type, starting symbol, and length, for each of the plurality of data channels;
performing a channel access procedure for each of the plurality of data channels; and
transmitting the plurality of data channels in the time domain resources in response to the channel access procedure for a corresponding data channel being successful.

* * * * *